United States Patent
Welch et al.

(10) Patent No.: US 8,462,021 B2
(45) Date of Patent: *Jun. 11, 2013

(54) APPARATUS AND METHOD FOR SIMULATING A VEHICLE TRACKING DEVICE IN A VEHICLE

(71) Applicant: Spireon, Inc., Knoxville, TN (US)

(72) Inventors: Timothy C. Welch, Knoxville, TN (US); David M. Meyer, Knoxville, TN (US)

(73) Assignee: Spireon, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/688,719

(22) Filed: Nov. 29, 2012

(65) Prior Publication Data

US 2013/0088371 A1   Apr. 11, 2013

Related U.S. Application Data

(63) Continuation of application No. 12/914,540, filed on Oct. 28, 2010, now Pat. No. 8,368,561.

(51) Int. Cl.
*G08G 1/123* (2006.01)

(52) U.S. Cl.
USPC ...... 340/988; 340/989; 340/425.5; 340/693.8

(58) Field of Classification Search
USPC ............... 340/988, 989, 425.5, 693.8, 933, 340/991, 952, 426.1, 426.8
See application file for complete search history.

(56) References Cited

U.S. PATENT DOCUMENTS 8,368,561 B2 * 2/2013 Welch et al. ............ 340/988

* cited by examiner

*Primary Examiner* — Toan N Pham
(74) *Attorney, Agent, or Firm* — Luedeka Neely Group, P.C.

(57) ABSTRACT

A simulated vehicle tracking device is installed in a conspicuous location in a vehicle. The simulated vehicle tracking device outwardly resembles the appearance of a functional vehicle tracking device, including one or more indicator lights that turn on to simulate the operation of indicator lights on a functioning vehicle tracking device. An functional vehicle tracking device is installed in an inconspicuous location in the vehicle. A person inclined to disable vehicle tracking will remove or disable the simulated vehicle tracking device instead of the functional vehicle tracking device.

16 Claims, 3 Drawing Sheets

APPARATUS AND METHOD FOR SIMULATING A VEHICLE TRACKING DEVICE IN A VEHICLE

RELATED APPLICATIONS

This application claims priority as a continuation of U.S. patent application Ser. No. 12/914,540 filed Oct. 28, 2010, which issued as U.S. Pat. No. 8,368,561 on Feb. 5, 2013, titled "Apparatus and Method for Simulating a Vehicle Tracking Device in a Vehicle," the entire contents of which are incorporated herein by reference.

FIELD

This invention relates generally to the field of vehicle monitoring systems. More particularly, this invention relates to a system for using a plainly visible simulated vehicle tracking device in a vehicle in conjunction with a hidden functional vehicle tracking device in the vehicle to assist in preventing the intentional and unwanted removal of the functional vehicle tracking device.

BACKGROUND

Knowledge of the location of a vehicle after it has been sold or rented is often desired. If the vehicle is financed by a loan for which the vehicle is collateral, the location of the vehicle should be known in case repossession becomes necessary. Traditionally, when repossession was necessary, lien holders or their representatives were forced to personally monitor the vehicle by venturing out to locate it. This method was inefficient and unreliable because the lien holder often had no reliable information about the vehicle's location, but rather relied on information provided by the buyer at the time of purchase. Additionally, due to the readily mobile nature of the collateral, obtaining an up-to-date and accurate location of the vehicle when a buyer was in default was difficult. In recent years, efforts have been made to simplify the task of tracking a vehicle for purposes of monitoring its location and for repossession. One such method that has drastically improved lien holders' ability to track vehicles is to equip the collateral (i.e. vehicle) with a mobile tracking device that can report the vehicle's location remotely.

However, as these tracking methods and devices have become more commonplace, a recurring problem has been that vehicle purchasers disable or remove them completely from the vehicle. The disabling and removal of the devices presents two problems for lien holders. Once the devices are disabled or removed, lien holders are again left with no information about the location of the vehicle. Furthermore, since the tracking devices are often integrated into the electrical system and connected to the body of the vehicle, the removal of the device by hasty or careless means often results in expensive damage to the device itself or to the vehicle.

What is needed, therefore, is an effective and inexpensive method of tracking vehicles while preventing the disablement or the removal of functional vehicle tracking devices from vehicles.

SUMMARY

The above and other needs are met by a method of using a simulated vehicle tracking device in a vehicle to deter the intentional and unwanted removal of a functional vehicle tracking device from the vehicle.

In one embodiment, the simulated vehicle tracking device includes a housing that is designed to give the simulated vehicle tracking device the shape and overall appearance of a functional vehicle tracking device. Many different housing designs would be available to permit the simulated vehicle tracking device to be used with a wide range of functional vehicle tracking devices. In addition, the simulated vehicle tracking device may optionally include one or more visible indicator lights and accompanying control logic placed inside of the housing. Activation of the indicator lights is sequenced to further give the simulated vehicle tracking device the appearance of a fully functional vehicle tracking device. Preferably, the control logic causes the lights to flash randomly or in a predetermined pattern.

Thus, preferred embodiments of the system provide a mechanism for deterring the intentional and unwanted removal of a functional vehicle tracking device from a vehicle. The functional vehicle tracking device is used to track the location of the vehicle remotely by broadcasting the location of the vehicle to a central monitoring service, and the simulated vehicle tracking device deters the removal of the functional vehicle tracking device from the vehicle. By implementing preferred embodiments of the system, persons seeking to prevent the detection of the location of a vehicle by removing the tracking device will be deceived by and will remove only the simulated vehicle tracking device, leaving the functional vehicle tracking device intact and functioning inside the vehicle.

Various embodiments of the system provide methods of using a simulated vehicle tracking device in a vehicle to deter removal or disablement of a functional vehicle tracking device. In one preferred embodiment, the method includes the following steps:

(a) installing the functional vehicle tracking device within the vehicle in an inconspicuous location such that the functional vehicle tracking device is not readily visible to vehicle occupants;

(b) connecting the functional vehicle tracking device to the vehicle's power source, such that the functional vehicle tracking device is operable to determine the vehicle's location and transmit location information to a central vehicle tracking service;

(c) installing the simulated vehicle tracking device within the vehicle in a conspicuous location such that the simulated vehicle tracking device is readily visible to one or more vehicle occupants;

(d) connecting the simulated vehicle tracking device to the vehicle's power source, such that the simulated vehicle tracking device is operable to visually simulate operational characteristics of the functional vehicle tracking device; and (e) activating one or more indicator lights on the simulated vehicle tracking device to turn on and off in a predetermined or random pattern.

In another aspect, the various embodiments of the system provide a simulated vehicle tracking device for use in deterring removal or disablement of a functional vehicle tracking device. In one preferred embodiment, the simulated vehicle tracking device includes a housing similar in size and appearance to a housing of a functional vehicle tracking device. A power connector disposed on the housing is designed to connect to a power source in a vehicle. Indicator lights are disposed on the housing which are similar in size and appearance to indicator lights of a functional vehicle tracking device. A controller disposed in the housing activates the indicator lights to turn on and off in a predetermined or random pattern to simulate operation of indicator lights of a functional vehicle tracking device. The pattern of activation of the indicator lights by the controller is independent of actual operation of any location determination device or wireless communication device.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

As the phrase is used herein, a "functional vehicle tracking device" is a device designed to be installed in a vehicle for the purpose of determining the vehicle's location, such as using GPS, and transmitting the vehicle's location coordinates to a central monitoring service. As used herein, a "simulated vehicle tracking device" is a device having an outward appearance that closely resembles or exactly matches the outward appearance of a functional vehicle tracking device, but which does not include one or more of the electronic components needed for determining vehicle position or transmitting vehicle position coordinates.

Figure 1A:
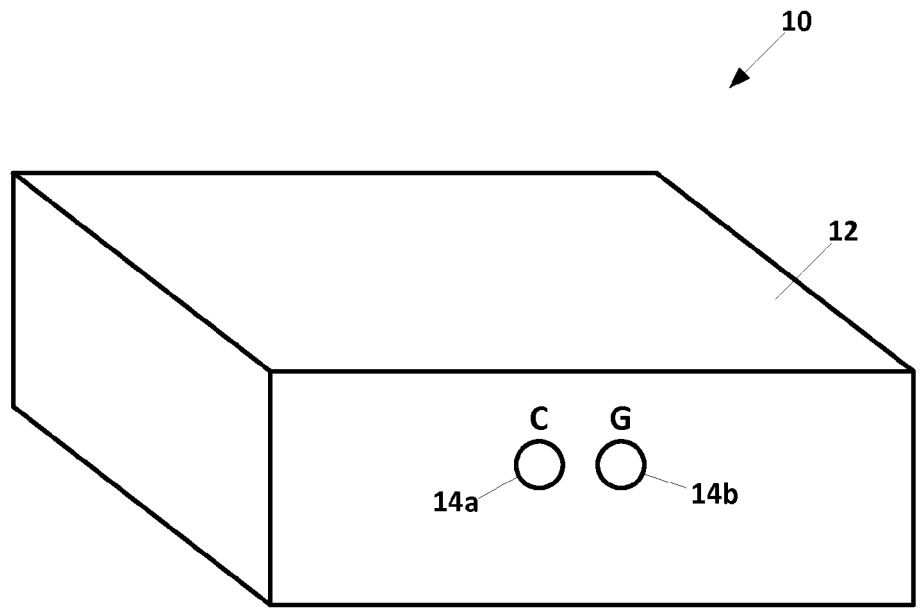
FIGS. 1A and 1B depict front and rear views of a simulated vehicle tracking device.
Figure 1B:
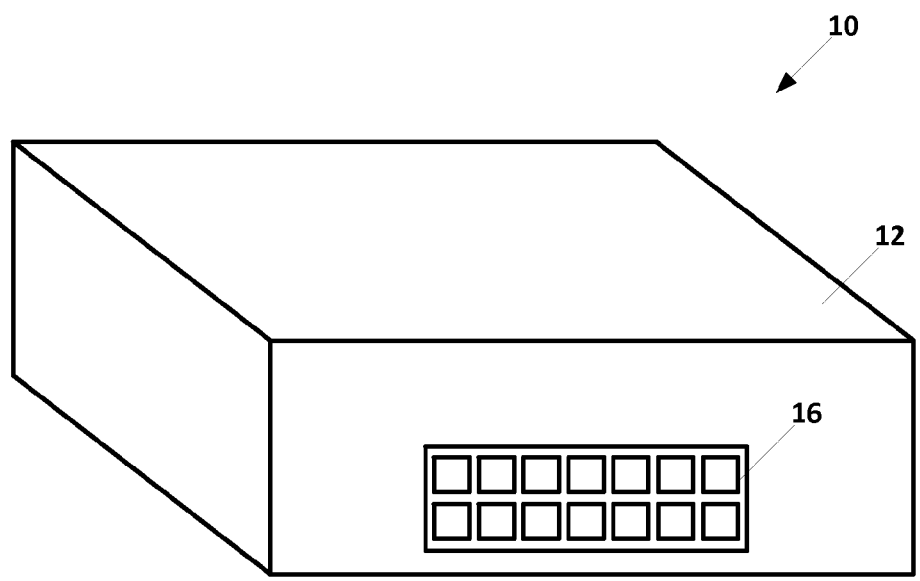

As shown in FIGS. 1A and 1B, a preferred embodiment of a simulated vehicle tracking device 10 includes a housing 12 that closely resembles or exactly matches the housing of a functional vehicle tracking device. The device 10 includes indicator lights 14a and 14b which simulate indicator lights found on a functional vehicle tracking device. The device 10 also includes a power connector 16 having electrical contacts for connecting the device 10 to power connections in the vehicle. Preferably, the power connector 16 of the device 10 physically resembles a power connector found on a functional vehicle tracking device. In the embodiment depicted in FIGS. 1A and 1B, the power connector 16 and indicator lights 14a-14b are on opposite ends of the housing. However, the invention is not limited to any particular relative positioning of these components.

In a functional vehicle tracking device, a light resembling the indicator light 14a may indicate the status of a cellular link between a functional vehicle tracking device and a cellular wireless communication network. For example, this light flashing at a slow rate may indicate that a cellular signal is available, whereas this light flashing at a fast rate may indicate that no cellular signal is available. In a functional vehicle tracking device, a light resembling the indicator light 14b may indicate whether the functional vehicle tracking device is receiving GPS signals from GPS satellites. For example, this light in a continuous ON state may indicate that a GPS signal is available and the GPS receiver is locked on, whereas this light in a continuous OFF state may indicate that no GPS signal is available or there is no GPS lock. In one preferred embodiment, the light 14a is a blue light-emitting diode (LED) and the light 14b is a green LED.

Figure 2:
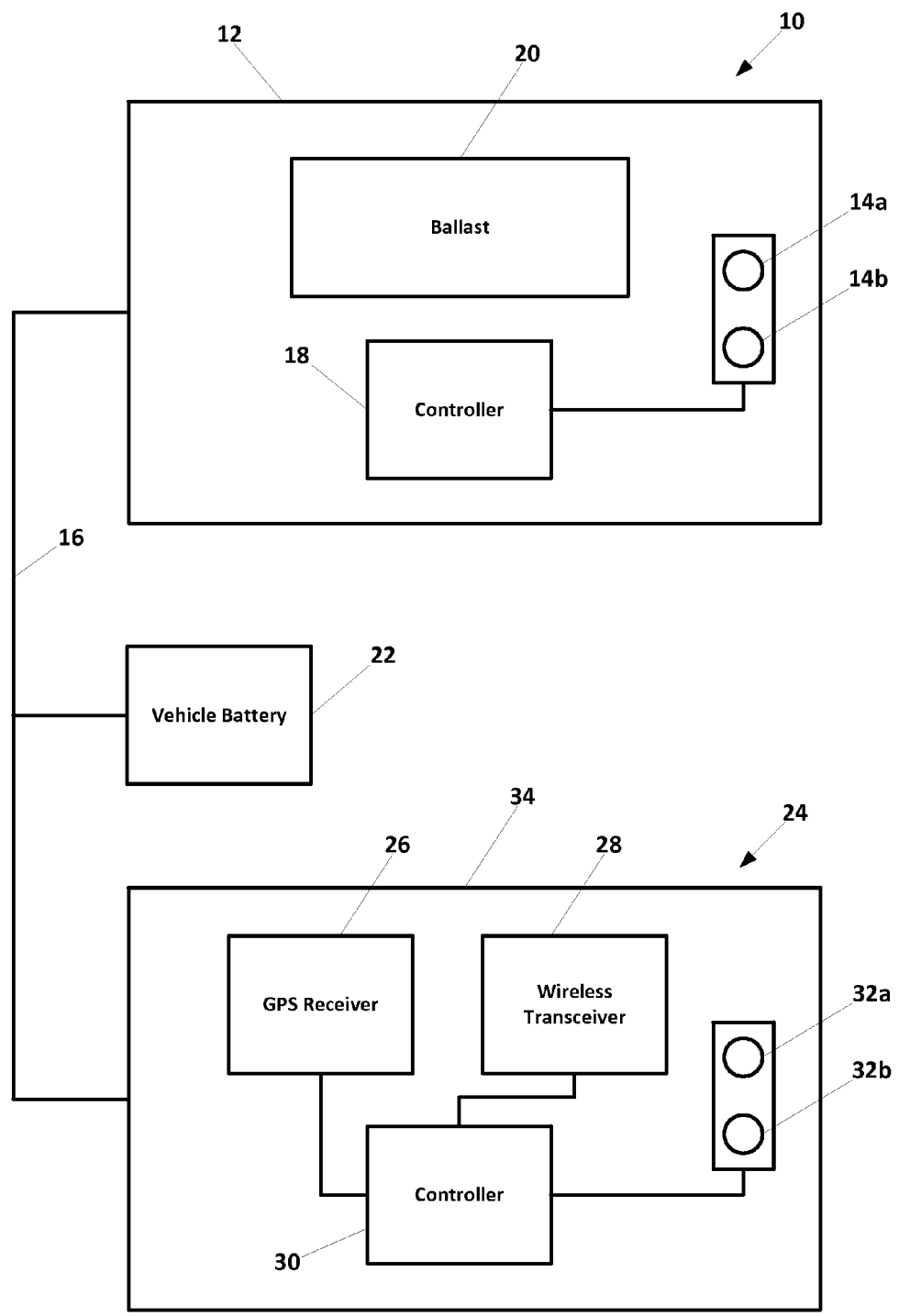
FIG. 2 depicts functional block diagrams of a simulated vehicle tracking device and a functional vehicle tracking device.

FIG. 2 depicts functional components of one embodiment of a simulated vehicle tracking device 10 and functional components of a functional vehicle tracking device 24. Both of the devices 12 and 24 receive power from a battery 22 or other power source within the vehicle. As shown in FIG. 2, the simulated vehicle tracking device includes a controller 18, which may be or include a microprocessor, for controlling the ON and OFF states of the indicator lights 14a-14b. Preferably, the controller 18 is programmed to control the indicator lights 14a-14b to be continuously ON or OFF or to flash ON and OFF at various predetermined or random time intervals to simulate the operation of indicator lights on a functional vehicle tracking device. For example, the controller 18 may control the indicator light 14a to simulate the operation of a cellular status indicator light, and control the indicator light 14b to simulate the operation of a GPS status indicator light. In a preferred embodiment, the controller 18 is activated and automatically begins controlling the lights 14a-14b when the device 10 is connected to the vehicle battery 22.

In some embodiments, the simulated vehicle tracking device 10 includes ballast 20 to cause the overall weight of the device 10 to be similar to the weight of a functional vehicle tracking device. This ballast 20 simulates the approximate weight of components of a functional tracking device, such as the GPS receiver and cellular transceiver, that are not present in the simulated tracking device 10.

As shown in FIG. 2, the functional vehicle tracking device 24 includes a Global Positioning System (GPS) receiver 26, a wireless transceiver 28 such as a cellular transceiver, and a controller 30 that controls operations of the GPS receiver 26, the wireless transceiver 28, and the indicator lights 32a and 32b.

Figure 3:
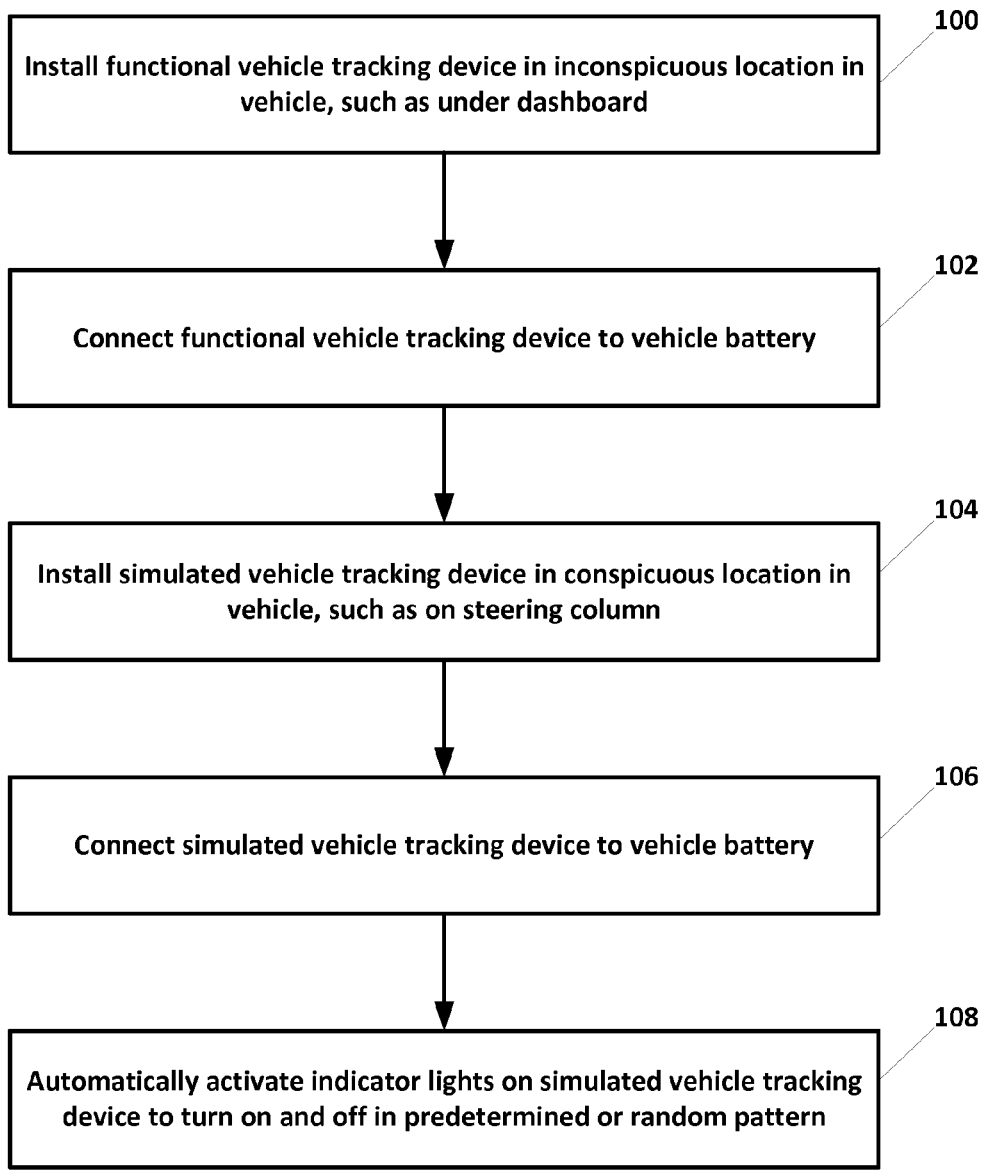
FIG. 3 depicts a functional flow diagram of a method for using a simulated vehicle tracking device in conjunction with a functional vehicle tracking device.

FIG. 3 depicts an embodiment of a method for using a simulated vehicle tracking device in a vehicle to deter removal or disablement of a functional vehicle tracking device. The method includes installing the functional vehicle tracking device 24 in an inconspicuous location within the vehicle, such as under the dashboard or in another location that is not readily viewable by occupants of the vehicle (step 100), and connecting the power connector of the functional vehicle tracking device 24 to the vehicle's power supply 22, such as through the vehicle's ignition wiring or through an OBD connector in the vehicle (step 102). The method also includes installing the simulated vehicle tracking device 10 in a conspicuous location within the vehicle, such as on the underside of the steering column or just beneath an edge of the dashboard in a visible location or in another location that is readily viewable by occupants of the vehicle (step 104), and connecting the power connector 16 of the simulated vehicle tracking device 10 to the vehicle's power supply 22, such as through the vehicle's ignition wiring or through an OBD connector in the vehicle (step 106). Once power is applied to the simulated vehicle tracking device 10, the controller 18 activates the indicator lights 14a-14b to turn ON and OFF in a predetermined pattern or randomly (step 108), thereby giving the appearance of a functional vehicle tracking device. Of course, the status of the indicator lights on the simulated vehicle tracking device is not dependent on the actual status of a GPS receiver or a cellular transceiver.

The installation of the functional and simulated vehicle tracking devices is performed by an installer in a manner that leads the vehicle operator to believe that the conspicuous simulated vehicle tracking device is an actual functional vehicle tracking device. Based on this belief, if the vehicle operator is inclined to disconnect a vehicle tracking device to prevent the tracking of the vehicle, he will disconnect the simulated vehicle tracking device 10 rather than the functional vehicle tracking device 24.

In some embodiments, the simulated vehicle tracking device includes a quick-disconnect power connector to provide for easy installation and removal from the vehicle. The quick-disconnect connector not only enables simple installation of the device in the vehicle, but will also minimizes damage done to the vehicle by hasty or careless removal. With a simple wiring harness 16 to connect the simulated vehicle tracking system to the vehicle's electrical system, even a person unfamiliar with the removal of such devices could do so while causing minimal damage to the vehicle. This wiring harness 16 is preferably visible upon cursory inspection and would not require tools or significant amount of labor to disconnect. In some embodiments, a simple system is employed to mount the simulated vehicle tracking device to the vehicle so that it may be easily detached from the vehicle. A simple vehicle mount may include a snap-on connection such as tabs or clips or, alternatively, it may include a simple screw-on connection where screws are used to connect the device to the vehicle. Alternatively, adhesives may be used to connect the device to the body of the vehicle.

In some embodiments, the functional vehicle tracking device may include a disconnect alert sensor for detecting the removal or disconnection of the simulated vehicle tracking device, and a wireless transmitter operable to transmit a disconnect alert signal to a central monitoring service. With this feature, notice can be provided to the lien holder or other party that the simulated vehicle tracking device has been tampered with. The alert signal preferably includes the location of the vehicle so that the vehicle may be found before the functional vehicle tracking device is located and removed.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of using a simulated vehicle tracking device in a vehicle to deter removal or disablement of a functional vehicle tracking device, the method comprising the steps of:
    (a) installing the functional vehicle tracking device within the vehicle in an inconspicuous location in which the functional vehicle tracking device is not readily visible to vehicle occupants;
    (b) connecting the functional vehicle tracking device to the vehicle's power source, such that the functional vehicle tracking device is operable to determine the vehicle's location and transmit location information to a central vehicle tracking service;
    (c) installing the simulated vehicle tracking device within the vehicle in a location in which the simulated vehicle tracking device is readily visible to one or more vehicle occupants who are looking for the functional vehicle tracking device; and
    (d) connecting the simulated vehicle tracking device to the vehicle's power source, such that the simulated vehicle tracking device is operable to visually simulate operational characteristics of the functional vehicle tracking device.

2. The method of claim 1 further comprising activating one or more indicator lights on the simulated vehicle tracking device.

3. The method of claim 1 wherein step (a) comprises positioning the functional vehicle tracking device under a dashboard of the vehicle.

4. The method of claim 1 wherein step (c) comprises attaching the simulated vehicle tracking device to a steering column of the vehicle.

5. The method of claim 1 wherein step (b) includes connecting the functional vehicle tracking device to an OBD or OBD-II connector in the vehicle or to the vehicle's ignition wiring.

6. The method of claim 1 wherein step (d) includes connecting the simulated vehicle tracking device to an OBD or OBD-II connector in the vehicle or to the vehicle's ignition wiring.

7. A simulated asset tracking device for use in deterring removal or disablement of a functional asset tracking device, the simulated asset tracking device comprising:
    a housing similar in size and appearance to a housing of a functional asset tracking device;
    a power connection for connecting to a power source of a vehicle or other asset; and
    one or more indicator lights disposed on the housing, the one or more indicator lights similar in size and appearance to one or more indicator lights of a functional asset tracking device and operable to be activated when the power connection is connected to the power source of the vehicle or other asset.

8. The simulated asset tracking device of claim 7 further comprising a controller disposed in the housing for activating the one or more indicator lights to turn on and off in a predetermined or random pattern to simulate operation of one or more indicator lights of a functional asset tracking device, wherein the pattern of activation of the one or more indicator lights by the controller is independent of actual operation of any location determination device or wireless communication device.

9. The simulated asset tracking device of claim 8 wherein the controller is programmable to simulate indicator light patterns of a plurality of models of functional asset tracking devices.

10. The simulated asset tracking device of claim 7 wherein the power connection is compatible for connection to an OBD or OBD-II connector in the vehicle or other asset.

11. The simulated asset tracking device of claim 7 wherein the power connection comprises a power harness for connecting to the power source of the vehicle or other asset.

12. The simulated asset tracking device of claim 7 wherein the one or more indicator lights comprise one or more LED's.

13. The simulated asset tracking device of claim 7 further including ballast to simulate a weight of components generally found in a functional asset tracking device, which components are not needed in the simulated asset tracking device.

14. A simulated vehicle tracking device for use in deterring removal or disablement of a functional vehicle tracking device, the simulated vehicle tracking device comprising:
    a housing similar in size and appearance to a housing of a functional vehicle tracking device;
    a power harness for connecting to a power source of a vehicle; and
    one or more indicator lights disposed on the housing, the one or more indicator lights similar in size and appearance to one or more indicator lights of a functional vehicle tracking device and operable to be activated when the power harness is connected to the power source of the vehicle.

15. The simulated vehicle tracking device of claim 14 wherein the power harness includes a power connector for connecting to the power source of the vehicle.

16. The simulated vehicle tracking device of claim 14 further including ballast to simulate a weight of components generally found in a functional vehicle tracking device, which components are not needed in the simulated vehicle tracking device.

* * * * *